US012486036B1

(12) United States Patent
     Roberts

(10) Patent No.: US 12,486,036 B1
(45) Date of Patent: *Dec. 2, 2025

(54) FUEL CELL TURBOELECTRIC FAN FOR AN AIRCRAFT

(71) Applicant: Tennessee Technological University, Cookeville, TN (US)

(72) Inventor: Rory Roberts, Cookeville, TN (US)

(73) Assignee: TENNESSEE TECHNOLOGICAL UNIVERSITY, Cookeville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/297,564

(22) Filed: Aug. 12, 2025

Related U.S. Application Data

(63) Continuation of application No. 19/194,287, filed on Apr. 30, 2025, now Pat. No. 12,397,918, which is a continuation of application No. 18/778,405, filed on Jul. 19, 2024, now Pat. No. 12,304,646.

(60) Provisional application No. 63/531,512, filed on Aug. 8, 2023.

(51) Int. Cl.

| | |
|---|---|
| *B64D 27/33* | (2024.01) |
| *B64D 27/10* | (2006.01) |
| *B64D 27/355* | (2024.01) |
| *F01D 15/10* | (2006.01) |
| *F02C 7/22* | (2006.01) |

(52) U.S. Cl.
CPC .............. *B64D 27/33* (2024.01); *B64D 27/10* (2013.01); *B64D 27/355* (2024.01); *F01D 15/10* (2013.01); *F02C 7/22* (2013.01); *F05D 2220/76* (2013.01)

(58) Field of Classification Search
CPC . B64D 27/33; B64D 29/06; F02C 7/32; F02C 7/36; F02C 6/04; F02C 6/10; F02K 1/04
See application file for complete search history.

(56) References Cited

U.S. PATENT DOCUMENTS

| | | | |
|---|---|---|---|
| 11,724,815 B2* | 8/2023 | Mackin | F02C 3/113 60/801 |
| 2015/0075176 A1 | 3/2015 | Ruthemeyer et al. | |
| 2016/0146051 A1 | 5/2016 | Debray et al. | |

(Continued)

OTHER PUBLICATIONS

International Search Report and Written Opinion received in International application No. PCT/US24/38816.

*Primary Examiner* — Thuyhang N Nguyen
(74) *Attorney, Agent, or Firm* — André J. Bahou; Alex Huffstutter; Bradley Arant Boult Cummings LLP

(57) ABSTRACT

A propulsion system for an aircraft as disclosed herein may include a nacelle, a shaft positioned centrally within a cylindrical passageway of the nacelle, a fan coupled to one end of the shaft, a turbine coupled to an opposite end of the shaft, an electric motor coupled to the shaft, a compressor positioned within the cylindrical passageway, and a solid oxide fuel cell positioned with a hollow ring-shaped interior of the nacelle. The hollow ring-shaped interior may surround and be isolated from the cylindrical passageway. The turbine may be configured to provide primary torque to the shaft while the electric motor may be configured to provide additional torque to the shaft. The electric motor may be powered an electric output of the solid oxide fuel cell while the turbine may be powered at least in part by output gases from the solid oxide fuel cell.

19 Claims, 14 Drawing Sheets

(56) References Cited

U.S. PATENT DOCUMENTS

| | | | |
|---|---|---|---|
| 2020/0354068 A1* | 11/2020 | Razak | B64D 27/10 |
| 2022/0025823 A1 | 1/2022 | Kupratis et al. | |
| 2024/0162459 A1 | 5/2024 | Hong et al. | |

* cited by examiner

FUEL CELL TURBOELECTRIC FAN FOR AN AIRCRAFT

CROSS-REFERENCES TO RELATED APPLICATIONS

This application is a continuation of U.S. Non-Provisional patent application Ser. No. 19/194,287, filed Apr. 30, 2025, which is a continuation of U.S. Non-Provisional patent application Ser. No. 18/778,405, filed Jul. 19, 2024, which claims the benefit of U.S. Provisional Patent Application Ser. No. 63/531,512 filed Aug. 8, 2023, the entire disclosures of which are incorporated herein by reference.

STATEMENT REGARDING FEDERALLY SPONSORED RESEARCH OR DEVELOPMENT

The subject matter herein was funded in part by Department of Energy, ARPA-E REEACH Research Program Grant No. DE-AR0001348, titled "High Power Density Carbon Neutral Electrical Power Generation for Air Vehicles," and led by Tennessee Tech University.

This non-provisional patent application is filed by Applicant and Assignee Tennessee Technological University in Cookeville, Tennessee. The inventor is Rory Roberts, a resident of the United States residing in Cookeville, Tennessee, for the invention entitled "Fuel Cell Turboelectric Fan for an Aircraft."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

1. Field of the Invention

The present disclosure relates generally to an aircraft propulsion system. More particularly, the present disclosure pertains to a hybrid fuel cell aircraft propulsion system.

2. Description of the Prior Art

A traditional commercial aircraft typically consists of a fuselage, a pair of wings, and a propulsion system responsible for generating thrust. This propulsion system commonly comprises multiple aircraft engines, such as turbofan jet engines that utilize gas or jet fuel, which are usually mounted beneath the wings in a suspended position, separate from the wings and fuselage.

In recent times, there has been a growing interest in hybrid-electric propulsion systems for aircraft. These systems incorporate an electric power source to supply electrical energy to an electric fan, which then propels the aircraft. To facilitate this process, a power bus is employed to transfer electrical power from the electric power source to the electric fan. It is worth noting that the power is typically transmitted in the form of direct current (DC), which is widely recognized as a more suitable means of power transmission, particularly at higher altitudes.

In hybrid-electric systems, the electrical power may be generated and utilized in alternating current (AC) form. Consequently, the power bus is equipped with switching stations, also known as terminal stations, to convert the electrical power between AC and DC forms. Nevertheless, these switching stations or terminal stations tend to be relatively heavy, resulting in inefficiencies in the design of hybrid-electric aircraft. Therefore, the development of a propulsion system for an aircraft capable of addressing these limitations would be highly advantageous. A challenge for electric or hybrid electric based propulsion systems is the massive amount of electricity that has to be distributed throughout the aircraft. The large amount of electrical power that typically has to be distributed requires significant mass and volume for transmitting the electrical power (copper/aluminum wires) or superconducting electrical distribution system. A superconducting distribution system has its own challenges with thermal management of cryogenic operating temperatures.

BRIEF SUMMARY

In view of at least some of the above-referenced problems in hybrid-electric propulsion systems for aircrafts, an exemplary object of the present disclosure may be to provide a new aircraft propulsion system. The aircraft propulsion system disclosed herein is a transformative technology dramatically increasing efficiency and capability while being fuel flexible for both small and large aircraft platforms. State-of-the-art propulsion systems' efficiency is defined as Thrust Specific Fuel Consumption (TSFC) [pounds mass fuel per hour divided by pounds force thrust lbm/(lbf*hr)]. The "CFM Leap 1B" is considered one of the most efficient commercial turbofan engines for commercial aviation. The "CFM Leap 1B" has a TSFC of 0.53 lbm/(lbf*hr). The aircraft propulsion system disclosed herein has a TSFC of 0.26 lbm/(lbf*hr). This translates to a reduction of 50% fuel consumption during flight. The aircraft propulsion system disclosed herein is quieter and provides more electric power during cruise which is a benefit for supporting electrical payloads typically required during long durations, such as military unmanned aircraft. The technology also provides significant reduction in emissions and enables cleaner fuel sources to be used for aviation.

An exemplary such system may desirably feature a ducted fan that encompasses a solid oxide fuel cell (SOFC) integrated with a gas turbine, an electric motor, and/or an electric generator. The SOFC may replace, or work in conjunction with, the traditional combustor of the gas turbine to produce electricity and heat. The heat produced by the SOFC may be utilized by the gas turbine to produce mechanical power that drives the shaft which then drives the ducted fan. The electricity produced by the SOFC may be utilized by the electric motor to drive the same shaft as the gas turbine providing more mechanical power to drive the fan. Excess power from the SOFC can be produced to support electric payloads on the aircraft. The electric motor may function in reverse as a generator to provide additional electricity to the aircraft as well as advantages in dynamic operation during transient events, such as, take-off, landing/missed approach, speed changes, or the like. The exemplary such system may further reduce the number of components and subsystems. The configuration of the SOFC (layout) in a radial pattern in the outer nacelle of the ducted fan provides an innovative design with the nacelle providing multiple functions. The nacelle: (1) contains the fan and directs the air flow internally for optimizing flow, pressure and thrust, (2) houses the SOFC stack within, serving a pressurized containment, and (3) provides structural support for the SOFC, gas turbine, electric motor, flow paths, power electronics and fan, and in certain embodiments, may further house a gearbox and/or electrical generator.

The exemplary such system may further feature a reduced mass and volume, making it competitive with existing technologies for size and weight while decreasing the fuel usage by more than 50-70% over existing technologies. The exemplary such system may further feature a compact self-contained design that can be integrated with new and existing aircraft platforms.

In a particular embodiment, an exemplary aircraft propulsion system as disclosed herein may include a shaft, a fan, a turbine, an electric motor, and a solid oxide fuel cell. The fan may be coupled to a first end of the shaft. The turbine may be coupled to a second end of the shaft. The turbine may be configured to provide primary torque to the shaft. The electric motor may be coupled to one or more of the fan or the shaft. The electric motor may be configured to provide additional torque to the shaft. The solid oxide fuel cell may be configured to provide power to at least the electric motor, and further to provide output gases to the turbine. This parallel mechanical drive configuration for the fan, eliminates having a sole large generator on the gas turbine by having the gas turbine directly drive the fan mechanically, a gearbox may be required based on RPM matching of components for various thrust sizes of engines. The parallel hybrid such as this, the gas turbine directly drives the fan and the electric motor does as well from electrical power generated by the SOFC.

Alternatively, the gas turbine may be connected to a generator instead of direct drive of the shaft. The power of the electrical generator maybe used to drive the electric motor. The electric motor may be connected to the fan, powering it entirely or in parallel with the gas turbine. In a series hybrid, the gas turbine drives the generator and the motor powers the fan. One scenario where this would be preferable is if the gear box was heavier than adding generator and larger electric motor.

In a particular embodiment, an exemplary aircraft propulsion system as disclosed herein may include a nacelle, a shaft, a fan, a turbine, an electric motor, a compressor, a generator, a nozzle, and a solid oxide fuel cell. Alternatively, other embodiments of fuel cells may be implemented in place of a solid oxide fuel cell. The nacelle may have a hollow ring-shaped interior surrounding a cylindrical passageway therethrough. The cylindrical passageway may have a forward opening and a rearward opening. The shaft may be positioned centrally within the cylindrical passageway. The fan may be coupled to the shaft and positioned within the cylindrical passageway closer to the forward opening than to the rearward opening. The turbine may be coupled to the shaft and positioned within the cylindrical passageway closer to the rearward opening than to the forward opening. The turbine may be configured to provide primary torque to the shaft. The electric motor may be coupled to the shaft and positioned within the cylindrical passageway of the nacelle. The electric motor may be configured to provide additional torque to the shaft. The compressor may be coupled to the shaft and positioned within the cylindrical passageway. The solid oxide fuel cell may be positioned within the hollow ring-shaped interior of the nacelle or directly around the gas turbine providing compact hybrid engine located in the center of the cylinder and nacelle. The solid oxide fuel cell may be configured to receive compressed air from the compressor of the gas turbine, to provide electrical power to at least the electric motor, and to provide output gases to the turbine.

In an exemplary aspect according to the above-referenced embodiment, the system may further comprise a fuel source coupled to the solid oxide fuel cell.

In another exemplary aspect according to the above-referenced embodiment, fuel from the fuel source may be configured to be combusted within a combustion chamber of the solid oxide fuel cell after interacting with an anode of one or more solid oxide fuel cell tubes or stacks of the solid oxide fuel cell to define combustion products. The combustion products may interact with a cathode of the one or more solid oxide fuel cell tubes or stack of the solid oxide fuel cell prior to exiting the solid oxide fuel cell as the output gases.

In another exemplary aspect according to the above-referenced embodiment, the solid oxide fuel cell may include an exhaust manifold configured to direct combustion products of the combustion chamber away from the solid oxide fuel cell.

In another exemplary aspect according to the above-referenced embodiment, each of the exhaust manifold and the combustion chamber may be positioned at opposite ends of the solid oxide fuel cell.

In another exemplary aspect according to the above-referenced embodiment, the system may further comprise a combustor positioned within the cylindrical passageway of the nacelle, the combustor configured to receive one or more of the output gases from the solid oxide fuel cell and/or fuel from a fuel source, to produce combustor products, and to direct said combustor products to the turbine. This post combustion of the solid oxide fuel cell before the turbine enables peak power shaving during portions of flight such as take-off, missed approach, speed change, or the like.

In another exemplary aspect according to the above-referenced embodiment, the system may further comprise a nozzle coupled to the rearward opening of the cylindrical passageway of the nacelle. The exhaust from the turbine and air from the fan may mix prior to exiting the nozzle to produce thrust. In certain optional embodiments, the exhaust from the turbine and air from the fan may remain separate exiting multiple nozzles to produce thrust. The nozzle(s) may be a fixed area or a variable exit area.

In another exemplary aspect according to the above-referenced embodiment, the hollow ring-shaped interior may be separate or isolated from the cylindrical passageway.

In another exemplary aspect according to the above-referenced embodiment, the solid oxide fuel cell and generator (or motor/generator multifunction) on the shaft of the gas turbine may be configured to provide additional power to electric payloads of the aircraft.

In another exemplary aspect according to the above-referenced embodiment, the solid oxide fuel cell and generator (or motor/generator multifunction) on the shaft of the gas turbine may be configured to provide additional power to electric payloads of the aircraft including electrical storage in batteries or capacitors to provide electrical energy at different times of flight.

In another exemplary aspect according to the above-referenced embodiment, the solid oxide fuel cell may be radially disposed within the hollow ring-shaped interior of the nacelle fully surrounding the cylindrical passageway.

In another exemplary aspect according to the above-referenced embodiment, the solid oxide fuel cell may be radially disposed around the gas turbine fully surrounded by the cylindrical passageway within the nacelle. In a further exemplary aspect according to the above-referenced embodiment, the solid oxide fuel cell may be radially disposed around the gas turbine with no obvious nacelle present.

In another exemplary aspect according to the above-referenced embodiment, the solid oxide fuel cell may include a plurality of fuel cell units radially disposed within the hollow ring-shaped interior of the nacelle fully surrounding the cylindrical passageway.

In another exemplary aspect according to the above-referenced embodiment, the hollow ring-shaped interior of the nacelle may define a pressurized containment for the solid oxide fuel cell.

In another exemplary aspect according to the above-referenced embodiment, the solid oxide fuel cell may include a combustion chamber positioned between an anode and a cathode of one or more solid oxide fuel cell tubes.

In another exemplary aspect according to the above-referenced embodiment, the aircraft propulsion system may further include nacelle support struts positioned within the cylindrical passageway of the nacelle and configured to support one or more of the shaft, the fan, the turbine, the electric motor, or the compressor.

In another exemplary aspect according to the above-referenced embodiment, the nacelle support struts may include one or more passageways for routing the compressed air from the compressor to the solid oxide fuel cell and/or routing output gases from the solid oxide fuel cell to the turbine.

In another exemplary aspect according to the above-referenced embodiment, the one or more passageways of the nacelle support struts may be insulated and/or isolated from the cylindrical passageway of the nacelle.

In another exemplary aspect, aircraft propulsion system based turbofan technology may have two or more flow paths for the incoming air. All of the air flow may enter the system via the fan. The air flow may then split between the bypass duct and compressor. The compressor, combustor, and turbine may be part of the core of the turbofan engine. The ratio of air flowing through the bypass duct divided by the compressor air flowing through engine core may be defined as a bypass ratio. A majority of the thrust may be produced by the bypass air through the nozzle/fan nozzle. The engine core may produce additional thrust when the flow exits the turbine then nozzle/core nozzle, but the engine core's primary function may be to provide mechanical power for the fan. Operating efficiency of turbofans may increase by increasing the bypass ratio. Historically, turbofan engine manufacturers have increased the bypass ratio with each new high efficiency turbofan. There are, however, limits in the amount of bypass ratio. For example, the CFM Leap 1B engine has approximate bypass ratio of nine. Meaning nine times more air flows through the bypass duct than the compressor core. The Pratt and Whitney PW1100G-JM engine is part of the geared turbo fan engine class and has an approximate bypass ratio of 12.5. Typically, as bypass ratio increases the fan diameter increases and designed rotational speed of the fan decreases making it necessary to implement of gear box or some other technologies to transmit power from the low pressure shaft to the fan with mismatch in rotational speeds. The higher bypass ratio was made possible by having a gear box between the engine core low pressure shaft and the fan for the PW1100G-JM engine. The propulsion system described herein may increase the bypass ratio by harvesting energy in the fuel and compressor air flow via solid oxide fuel cell and directing the electrical energy produced by the solid oxide fuel cell to the electric motor which drives the fan. The fuel cell turboelectric fan may convert fuel to electricity via a solid oxide fuel cell, electricity to mechanical energy via electric motor, mechanical energy to total pressure (stagnation pressure) via the fan, and total pressure to thrust via a nozzle. The fuel cell turboelectric fan may in essence disclose and enable a system and method for increasing bypass ratio to more than 40.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
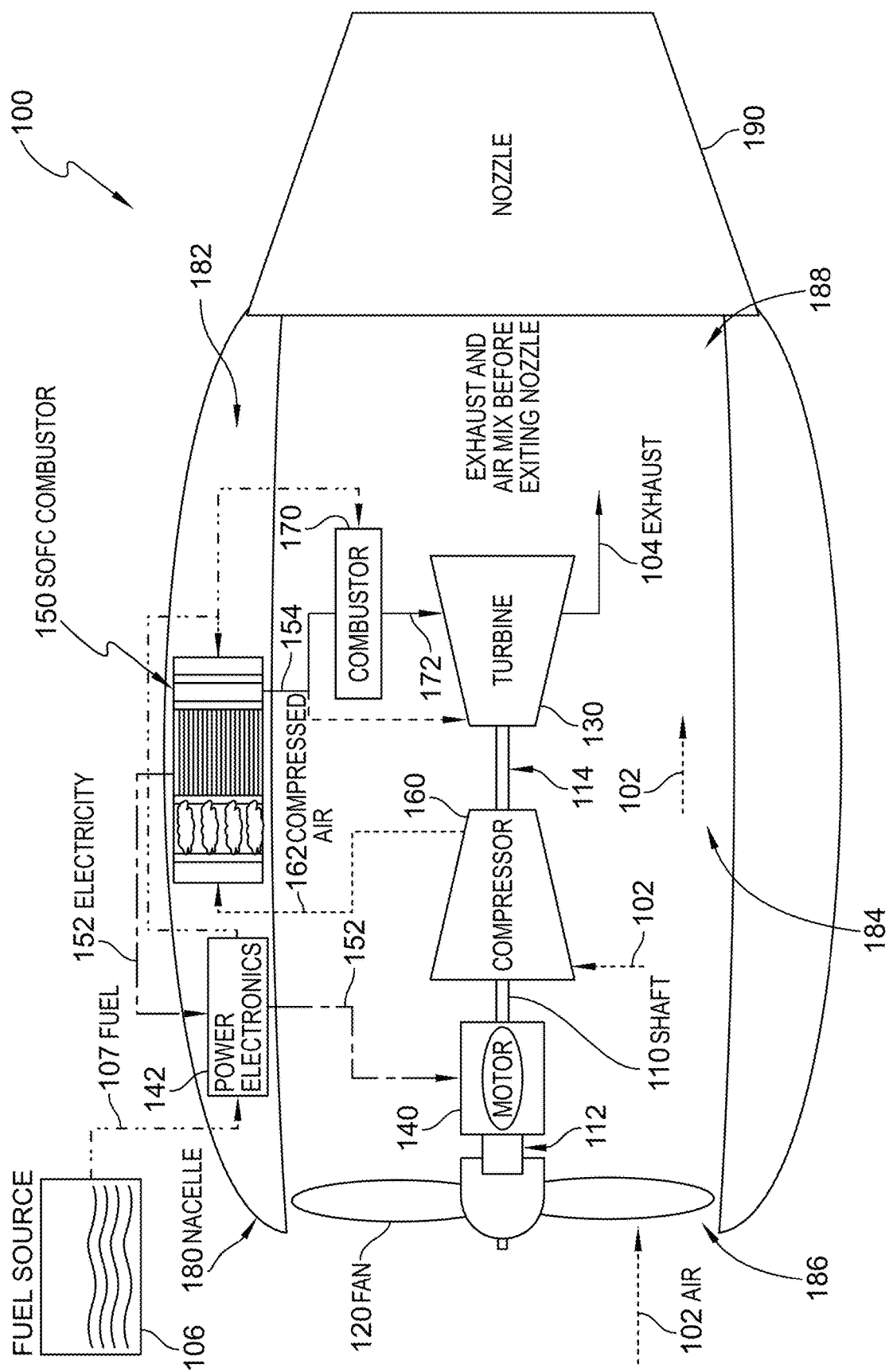
FIG. 1 is a cross-sectional side elevational view of an embodiment of an aircraft propulsion system in accordance with the present disclosure.

Referring to FIG. 1, an propulsion system 100 of an aircraft (not shown) is illustrated. The propulsion system 100 may also be referred to herein as a hybrid propulsion system 100. The propulsion system 100 may include fan 120, a turbine 130, an electric motor 140, and a solid oxide fuel cell 150. The propulsion system 100 may further include a shaft 110 coupled between the fan 120 and the turbine 130. The shaft 110 may include a first end 112 coupled to the fan 120 and a second end 114 coupled to the turbine 130. The turbine 130 may also be referred to herein as a gas turbine 130. The electric motor 140 may also be referred to herein as an electric generator, for example, when the electric motor is operated in reverse. In certain optional embodiments, fan 120 may include multiple fans (e.g., at least one fan). Each of the electric motor 140 and the turbine 130 may be configured to apply torque to the shaft 110 (e.g., primary torque from the turbine 130 and additional torque from the electric motor 140), or in other words, to drive the fan 120. For matching the shaft speed to appropriate design rotational speed of the fan, a gear box or continuous variable multidrive transmission may be implemented. Air 102 may enter the propulsion system 100 via the fan 120 and may exit the propulsion system 100 via the turbine 130, for example, as exhaust 104 or the nozzle 190.

The solid oxide fuel cell 150 may be configured to provide power 152 to the electric motor 140, electrical storage, aircraft loads, and/or electronics drive system 142 and further to provide output gases 154 to the turbine 130. The power 152 may, for example, be direct current (DC) electricity. The heat (e.g., output gases 154) produced by the solid oxide fuel cell 150 may be utilized by the turbine 130 to produce mechanical power that drives the shaft 110 which then drives the fan 120. The electricity (e.g., power 152) produced by the solid oxide fuel cell 150 is utilized by the electric motor 140 to drive the shaft 110 thereby providing more mechanical power to drive the fan 120. Excess power from the solid oxide fuel cell 150 may be produced to support other electric payloads or subsystems of the aircraft, such as, for example, the electronic drive system 142 for electric motor control, propulsion system control (Full Authority Digital Engine Control, FADEC), other electric driven propulsion systems, environmental control systems, electric payloads, electric weapons and radar systems, avionics, de-icing, electrical storage, and any other auxiliary electrical loads on the aircraft.

In certain optional embodiments, the propulsion system 100 may further include a compressor 160. The compressor 160 may also be coupled to the shaft 110 and may be powered via rotation of the shaft 110. The compressor 160 may be configured to supply compressed air 162 to the solid oxide fuel cell 150. Some of the air 102 from the fan 120 may enter the compressor 160, while other air bypasses the compressor 160 to mix with the exhaust 104. In certain optional embodiments, the compressor 160 may be integral with or part of the fan 120.

In other optional embodiments, the propulsion system 100 may further include fuel source 106. The fuel source 106 may at least be coupled to the solid oxide fuel cell 150. The fuel may be hydrogen (H2), which is often considered the ideal fuel for solid oxide fuel cells due to its high reactivity and clean combustion, resulting in water vapor as the only byproduct. Additionally, solid oxide fuel cells can directly use hydrocarbons such as methane (CH4), propane (C3H8), and butane (C4H10) as fuel sources, which are readily available and widely used. Bio Liquified Natural Gas (Bio LNG), produced from renewable sources such as organic waste or agricultural byproducts, can also be used as a fuel in solid oxide fuel cells. This renewable fuel option contributes to the environmental sustainability of solid oxide fuel cells, as it reduces greenhouse gas emissions and offers a carbon-neutral energy solution. The fuel flexibility of solid oxide fuel cells, including the utilization of Bio LNG, makes them suitable for various applications, offering the potential to leverage diverse fuel sources and address energy needs in different settings. Ammonia and hydrocarbons without sulfur may also be directly used as the fuel source. Fuel sources with sulfur would require pretreatment to remove the sulfur prior to entering the solid oxide fuel cells. The fuel from 106 may be used as a heat sink to cool the electric motor 140 and electronic drive system 142 for electric motor control and propulsion system control (FADEC). The fuel may also cool any hydraulic fluids in gear boxes or transmissions or lubricants for the rotating machinery and bearings.

In further optional embodiments, the propulsion system 100 may further include a combustor 170. The combustor 170 may be configured to provide additional power to the turbine 130, for example, during take-off and other high-powered segments of flight. The combustor products 172 may be expanded through the turbine 130 to produce mechanical power that drives the shaft 110 which then drives the fan 120. In certain optional embodiment, the combustor 170 may be configured to utilize fuel from the fuel source 106 for combustion. In other optional embodiments, the combustor 170 may be configured to utilize the output gases 154 from the solid oxide fuel cell 150 for combustion. In other optional embodiments, the combustor 170 may be configured to utilize the output gases 154 from the solid oxide fuel cell 150 for combustion.

In further optional embodiments, the propulsion system 100 may further include a combustor 170 integrated with fuel preprocessor form thermal management of the desulfurization and pre-reforming process to remove sulfur and breakdown large hydrocarbons down to simple hydrocarbons such as methane, ethane, propane, butane, and/or pentane.

In certain optional embodiments, the propulsion system 100 may further include a nacelle 180. As illustrated in FIGS. 1 and 2A-2E, the nacelle 180 may include a hollow ring-shaped interior 182. The hollow ring-shaped interior 182 may house the solid oxide fuel cell 150. In other optional embodiments, the solid oxide fuel cell 150 may be housed elsewhere within the aircrafts, such as within the fuselage, immediately around the gas turbine, or the wings. As illustrated in FIG. 1, the nacelle 180 may further include a cylindrical passageway 184 defined therethrough and having a first or forward opening 186 and a second or rearward opening 188. The hollow ring-shaped interior 182 may be separate from the cylindrical passageway 184 and may further define a pressurized containment for the solid oxide fuel cell 150. The shaft 110 may be positioned centrally within the cylindrical passageway 184. The fan 120 may be positioned within the cylindrical passageway 184 closer to the forward opening 186 and to the rearward opening 188. The turbine 130 may be positioned within the cylindrical passageway 184 closer to the rearward opening 188 than to the forward opening 186. Further, each of the electric motor 140, the compressor 160, and the combustor 170 may be positioned within the cylindrical passageway 184.

In other optional embodiments, the propulsion system 100 may further include a nozzle 190. The nozzle 190 may be positioned within the cylindrical passageway 184 proximate to the rearward opening 188. In certain optional embodiments, the nozzle 190 may be coupled to the rearward opening 188 of the cylindrical passageway 184. In other optional embodiments, the nozzle 190 may be coupled to the turbine 130 proximate the rearward opening 188 of the cylindrical passageway 184. The nozzle 190 may be configured to produce thrust as air and exhaust 104 enter the nozzle 190.

The nozzle 190 creates a narrowing passage through which the exhaust gases flow. As the gases pass through the narrowing section of the nozzle, their velocity increases due to the conservation of mass and the principle of fluid dynamics. This increased velocity leads to a corresponding increase in the thrust produced by the engine. The nozzle 190 facilitates the expansion of the high-pressure, high-temperature gases emitted by the combustion process. This expansion converts the thermal energy of the exhaust gases into kinetic energy, which contributes to the propulsion of the aircraft. By expanding the gases and increasing their velocity, the nozzle helps extract the maximum amount of energy from the combustion process. In certain optional embodiments, the nozzle 190 is designed to provide thrust vectoring capabilities. Thrust vectoring allows for the redirection of the exhaust flow, enabling the aircraft to have enhanced maneuverability, better control during flight, and the ability to perform specific maneuvers like takeoff, landing, and combat maneuvers. The exit area of nozzle 190 may be fixed or vary based on operating condition of propulsion system.

In other optional embodiments, the propulsion system 100 may further include multifunctional supports 189 for the fan 120, shaft 112,110,114, electric motor 140, compressor 160, turbine 130, and combustor 170. The multifunctional supports 189 may also be referred to herein as struts 189 or nacelle support struts 189. commonly known as struts within the cylindrical passageway 184. The structurally supporting struts may also route or contain the compressed air 162 from the compressor 160 to the solid oxide fuel cell 150 and output gases 154 from the solid oxide fuel cell 150 to the combustor 170 and turbine 130. The struts would also be insulated to contain the heat within the compressed air 162 and output gases 154. The struts would also be designed for thermal expansion and vibration dampening during operation.

Figure 2A:
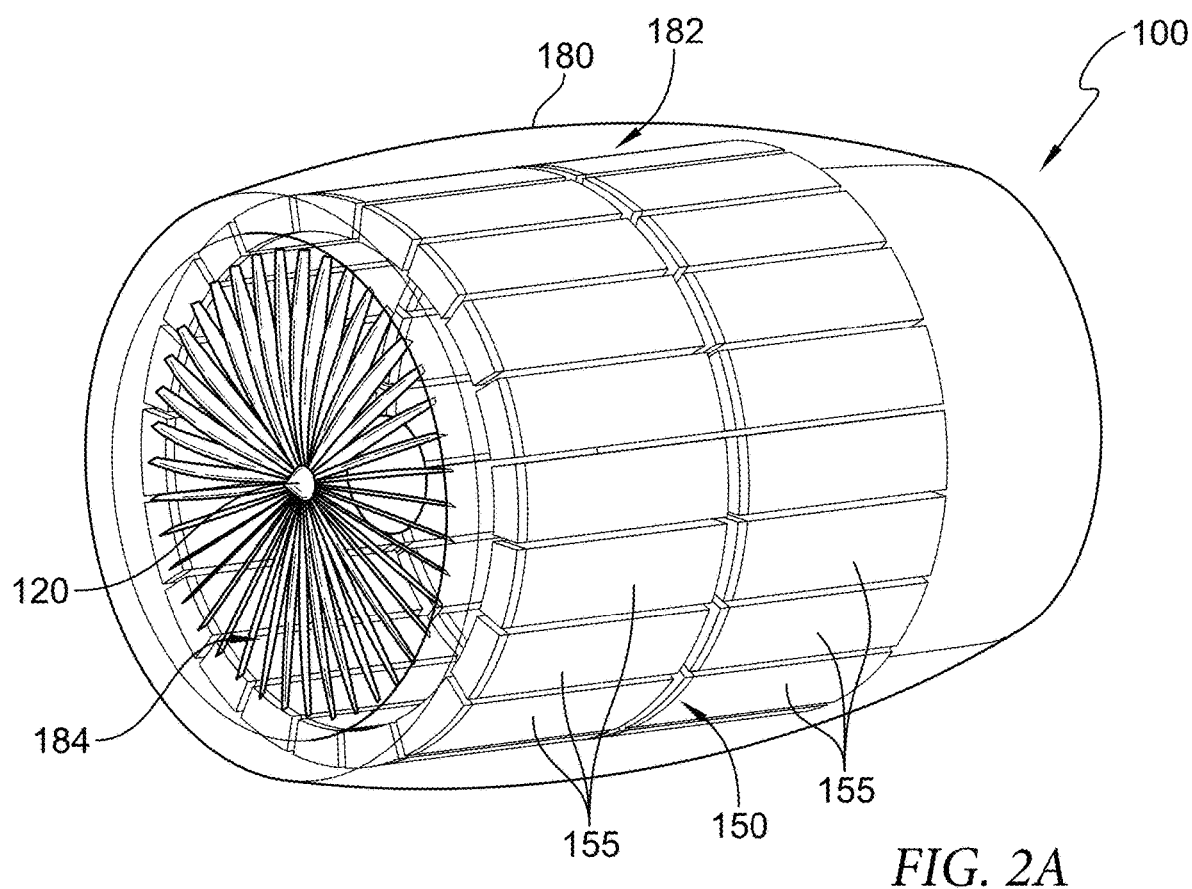
FIGS. 2A-2E are views of an embodiments of a nacelle of the aircraft propulsion system in accordance with the present disclosure.
Figure 2B:
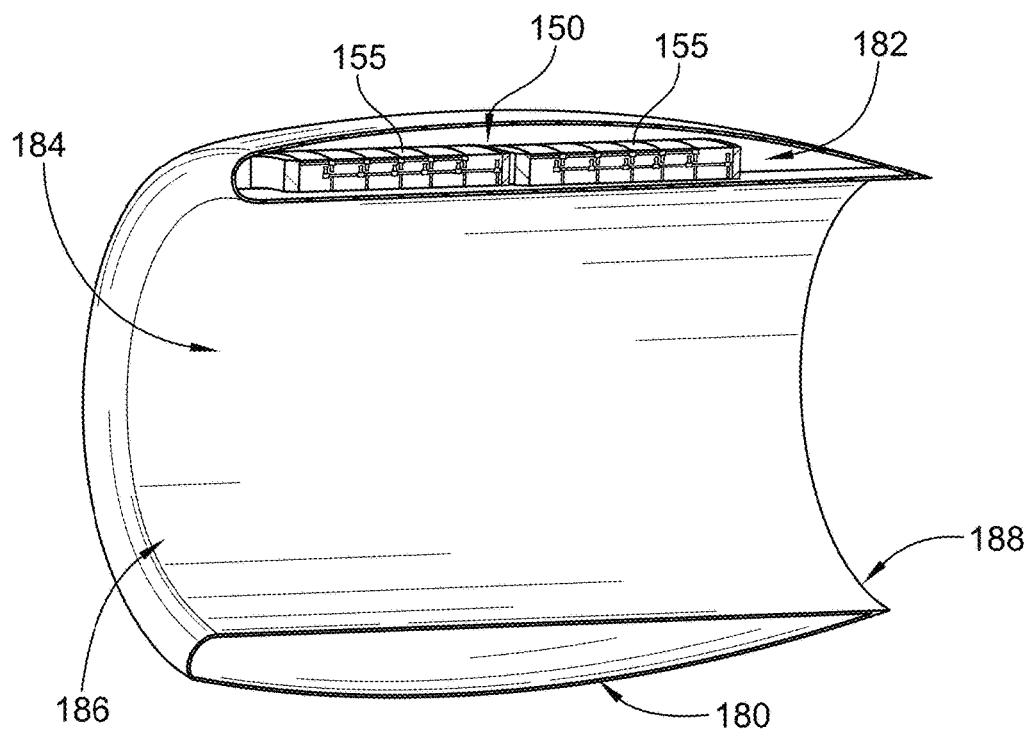
Figure 2C:
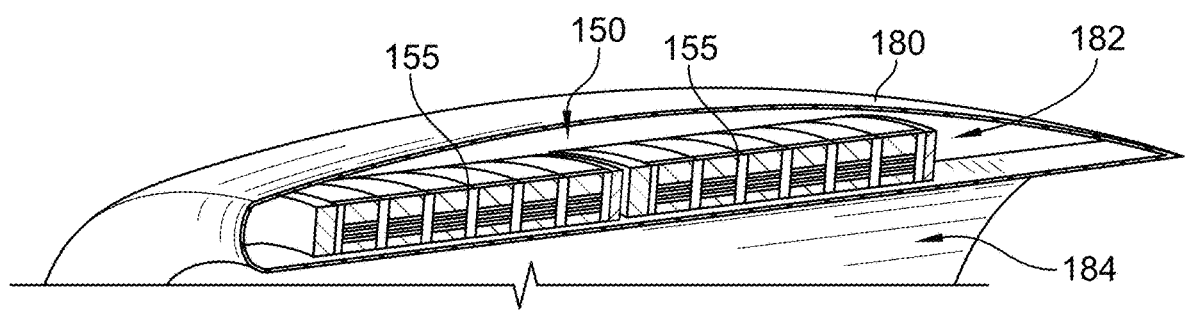
Figure 2D:
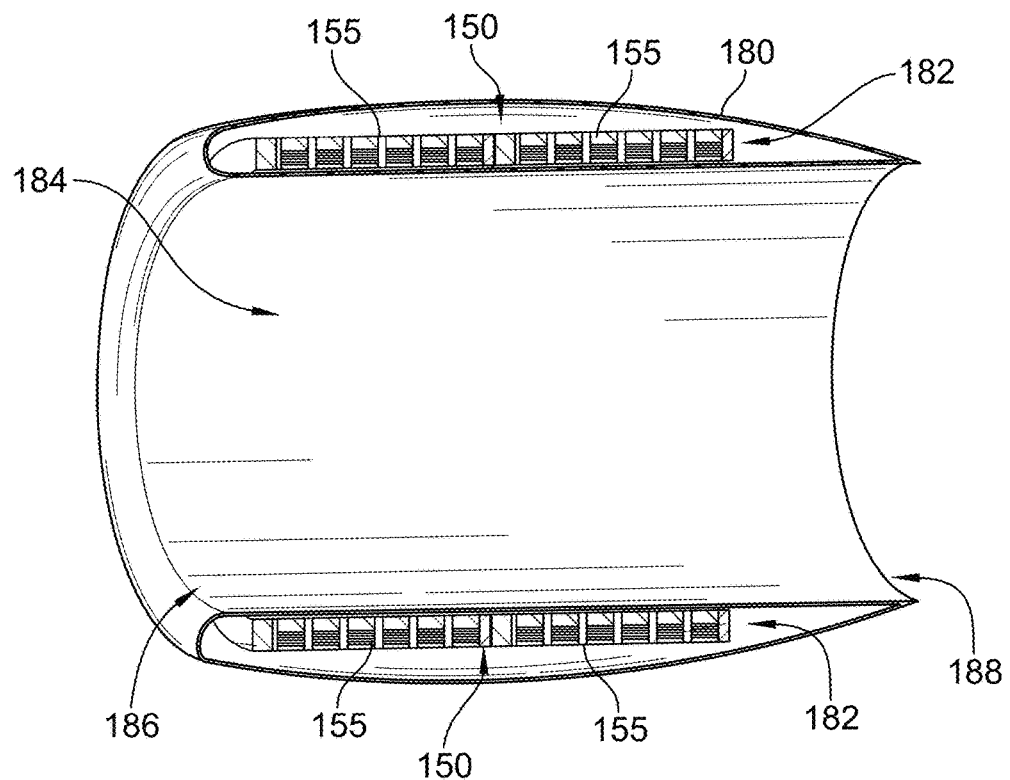
Figure 2E:
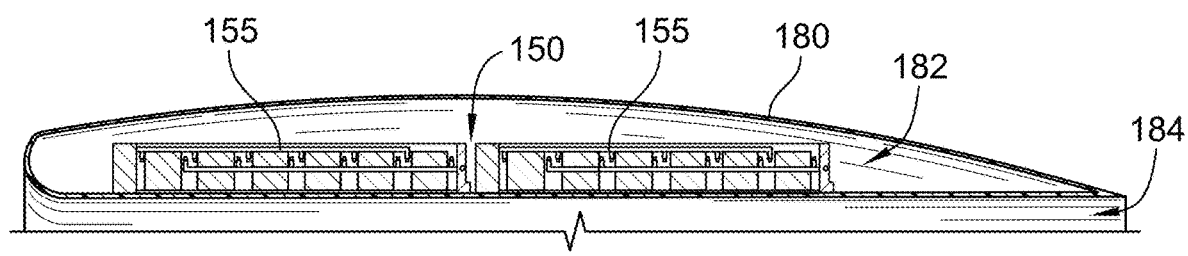
Figure 3A:
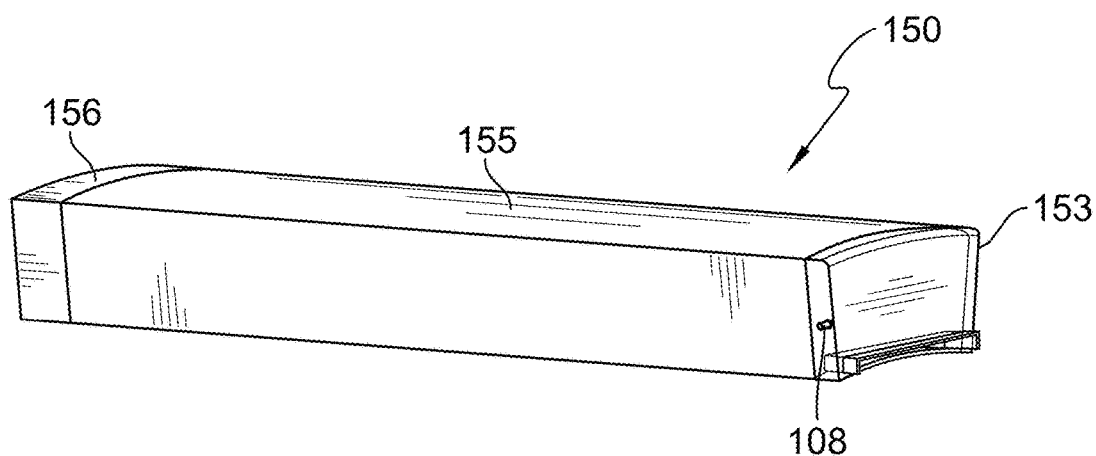
FIGS. 3A-3E are views of an embodiment of a fuel cell unit of a solid oxide fuel cell of the aircraft propulsion system in accordance with the present disclosure.
Figure 3B:
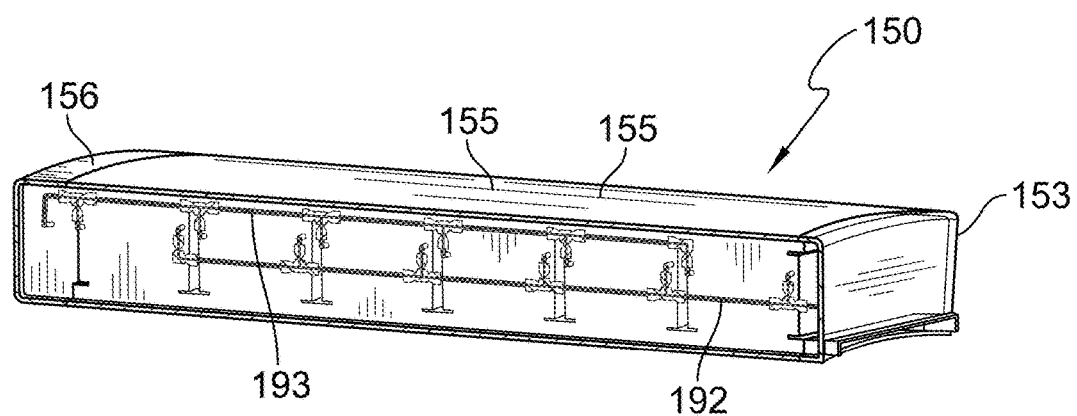
Figure 3C:
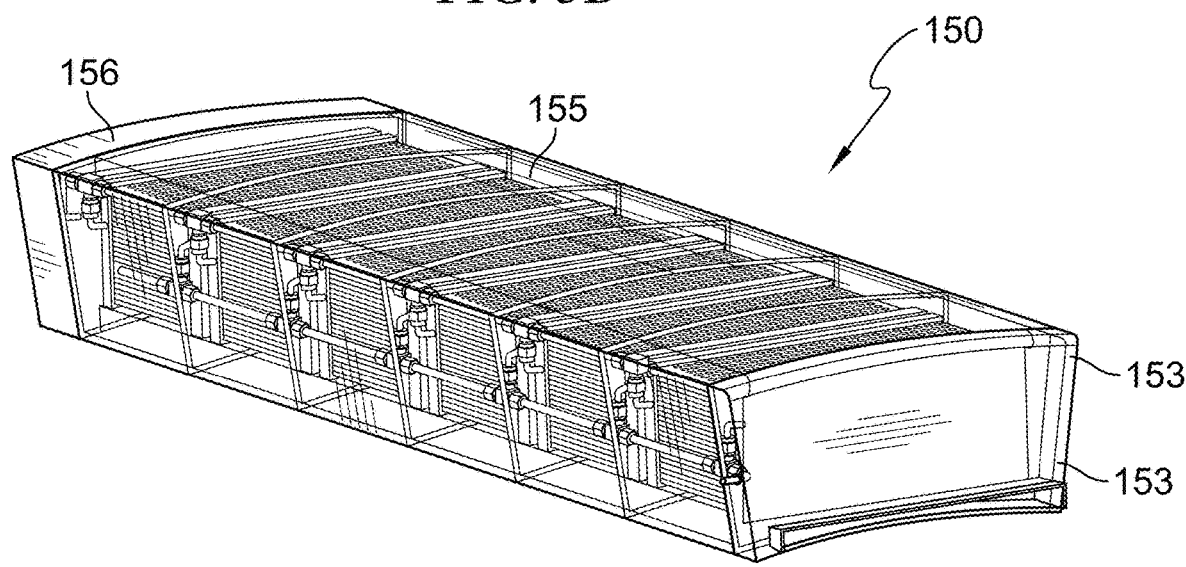
Figure 3D:
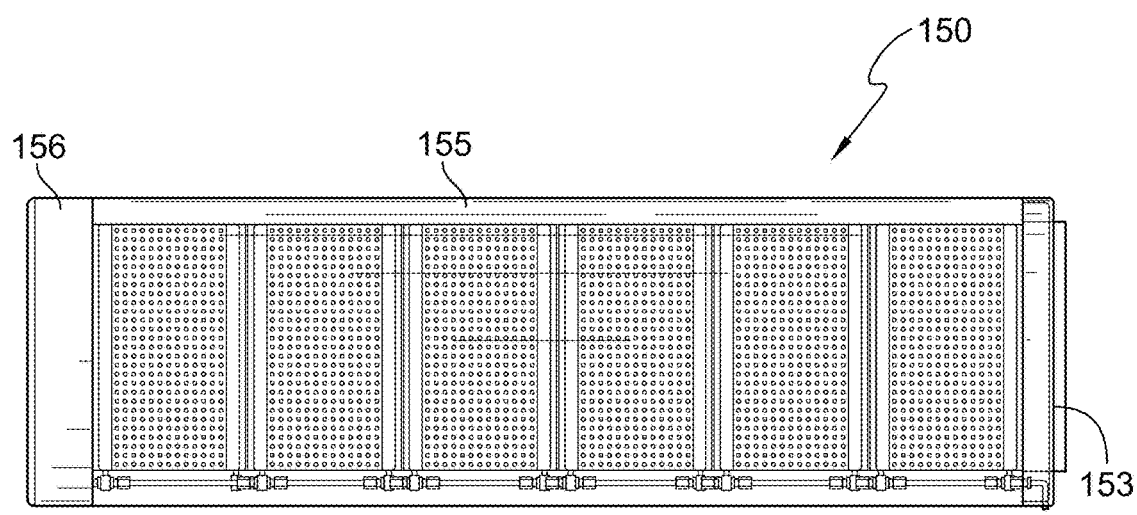
Figure 3E:
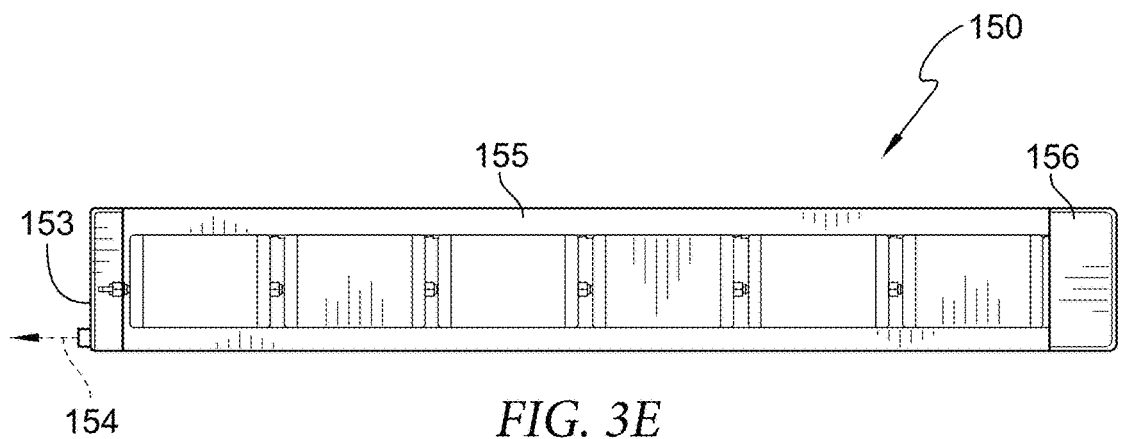

Referring to FIGS. 2A-2E, the solid oxide fuel cell 150 may comprise a plurality of fuel cell units 155. As illustrated in FIG. 2A, the plurality of fuel cell units 155 may be disposed radially within the hollow ring-shaped interior 182 of the nacelle 180. The solid oxide fuel cell 150 may fully surround the cylindrical passageway 184 of the nacelle 180.

Figure 6A:
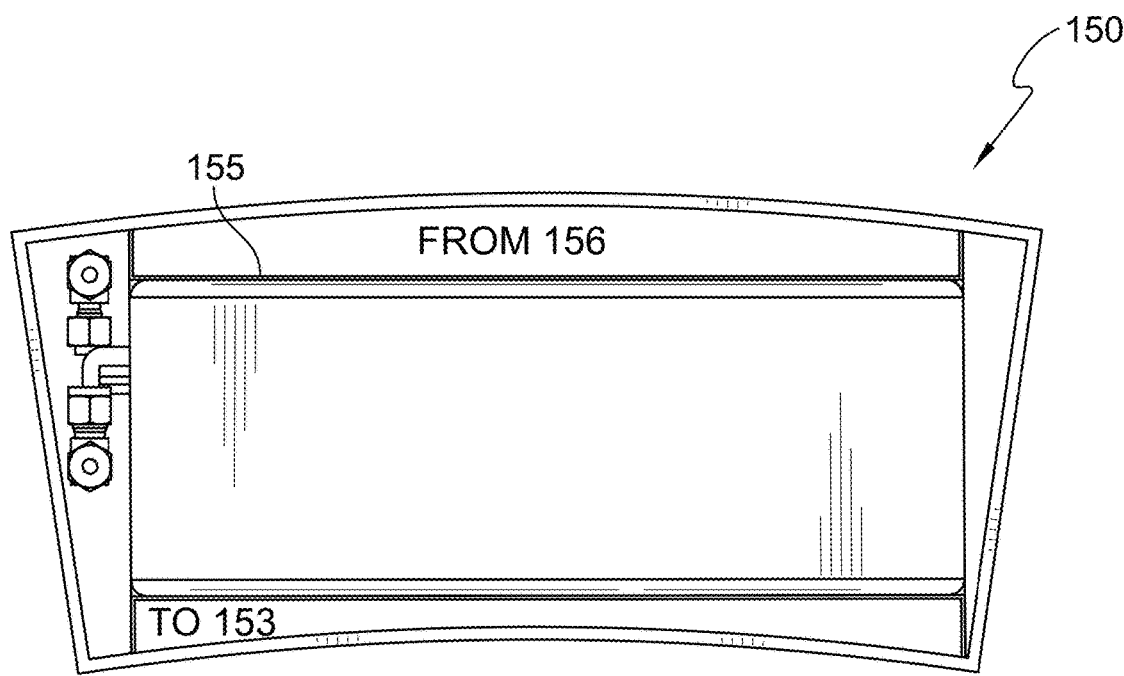
FIGS. 6A-6C are views of an embodiment of a fuel cell unit of the solid oxide fuel cell of the aircraft propulsion system in accordance with the present disclosure.
Figure 6B:
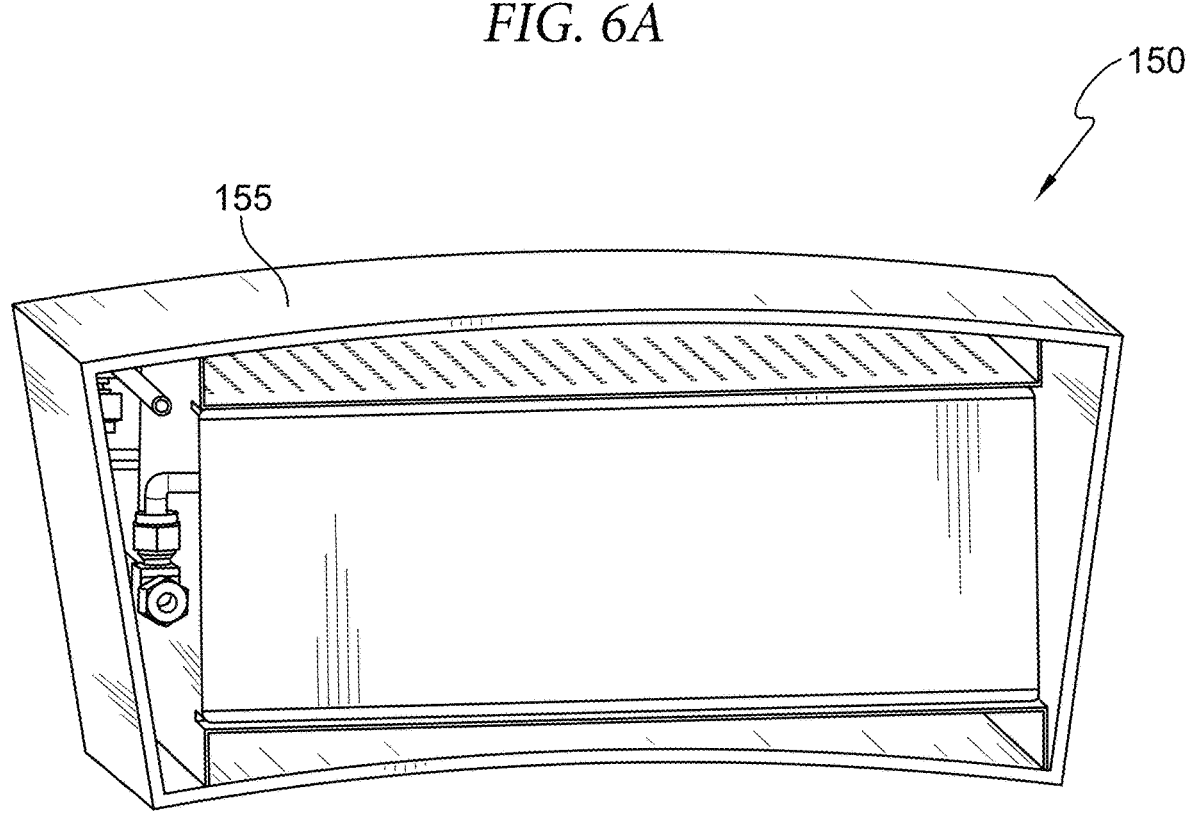
Figure 6C:
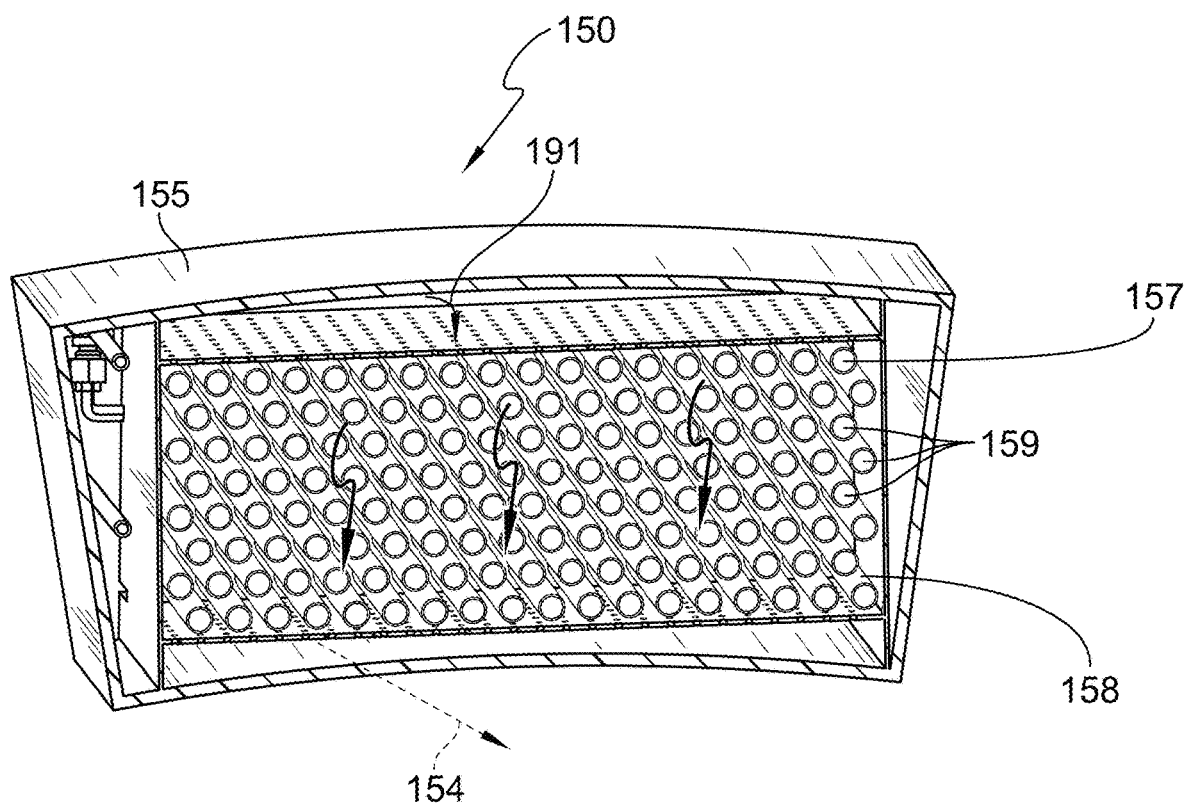
Figure 7A:
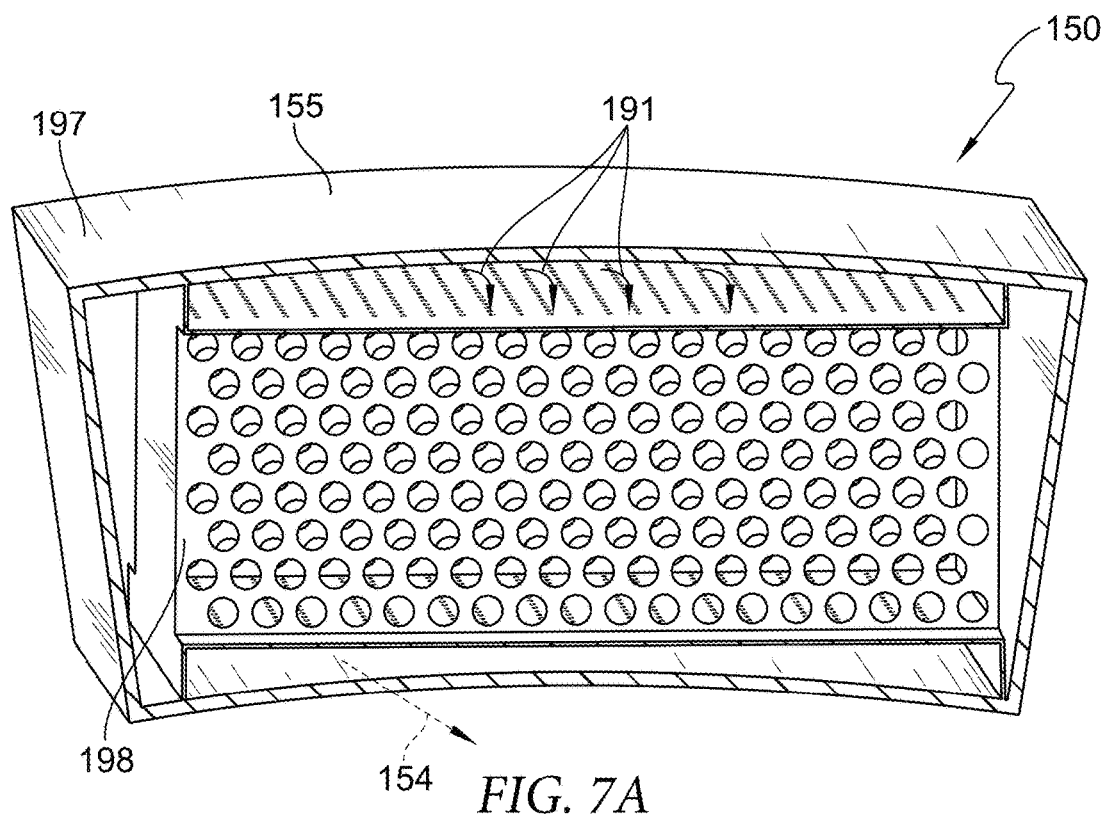
FIGS. 7A-7B are views of an embodiment of the fuel cell unit of FIGS. 6A-6C without manifolds, rods, or plumbing in accordance with the present disclosure.
Figure 7B:
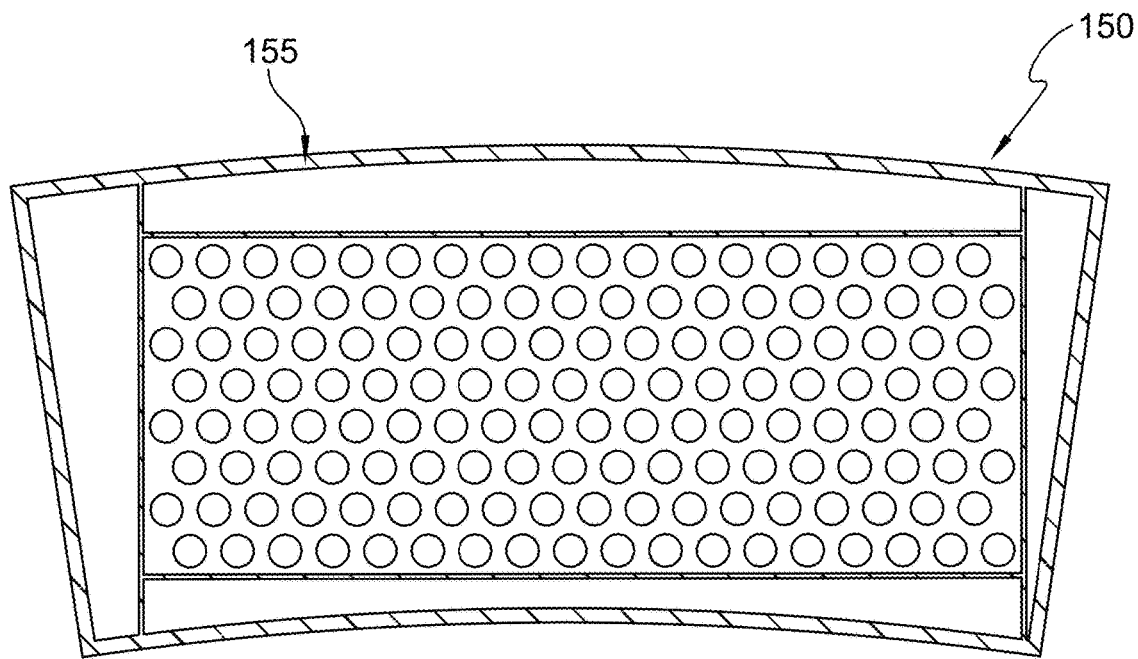

Referring to FIG. 3A-3E, each fuel cell unit 155 may include a combustion chamber 156 positioned between an anode 157 and a cathode 158 of each of one or more solid oxide fuel cell tubes or stacks 159 (shown in FIG. 6C) of the fuel cell unit 155. Anode input lines 192 may direct fuel 107 from the fuel source 106 via a fuel inlet 108 to each anode 157. Anode output lines 193 may direct the fuel 107 exiting the anode 157 towards the combustion chamber 156 via an opening 195 to the combustion chamber 156, as shown in FIG. 4B.

Figure 4A:
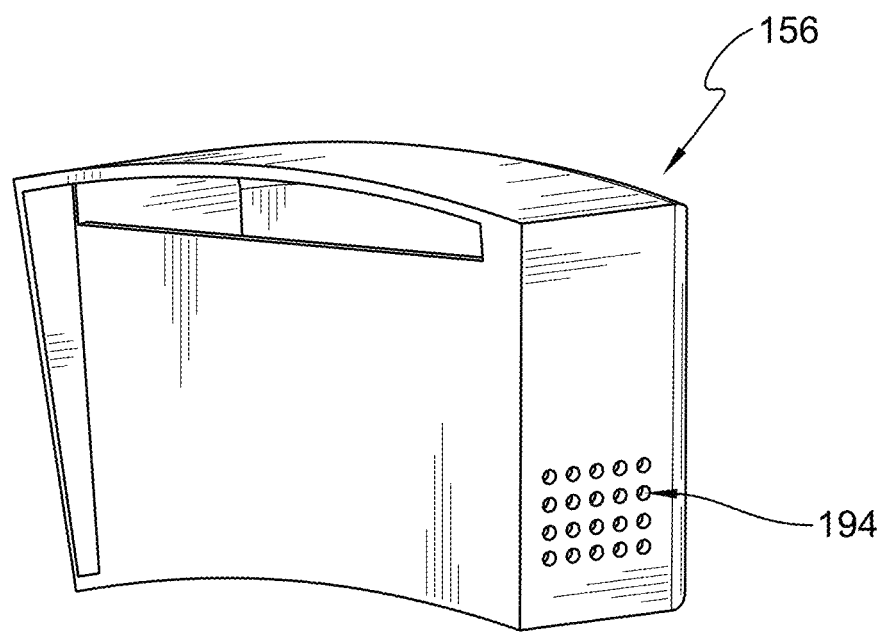
FIGS. 4A-4B are views of an embodiment of a combustion manifold of the solid oxide fuel cell of the aircraft propulsion system in accordance with the present disclosure.
Figure 4B:
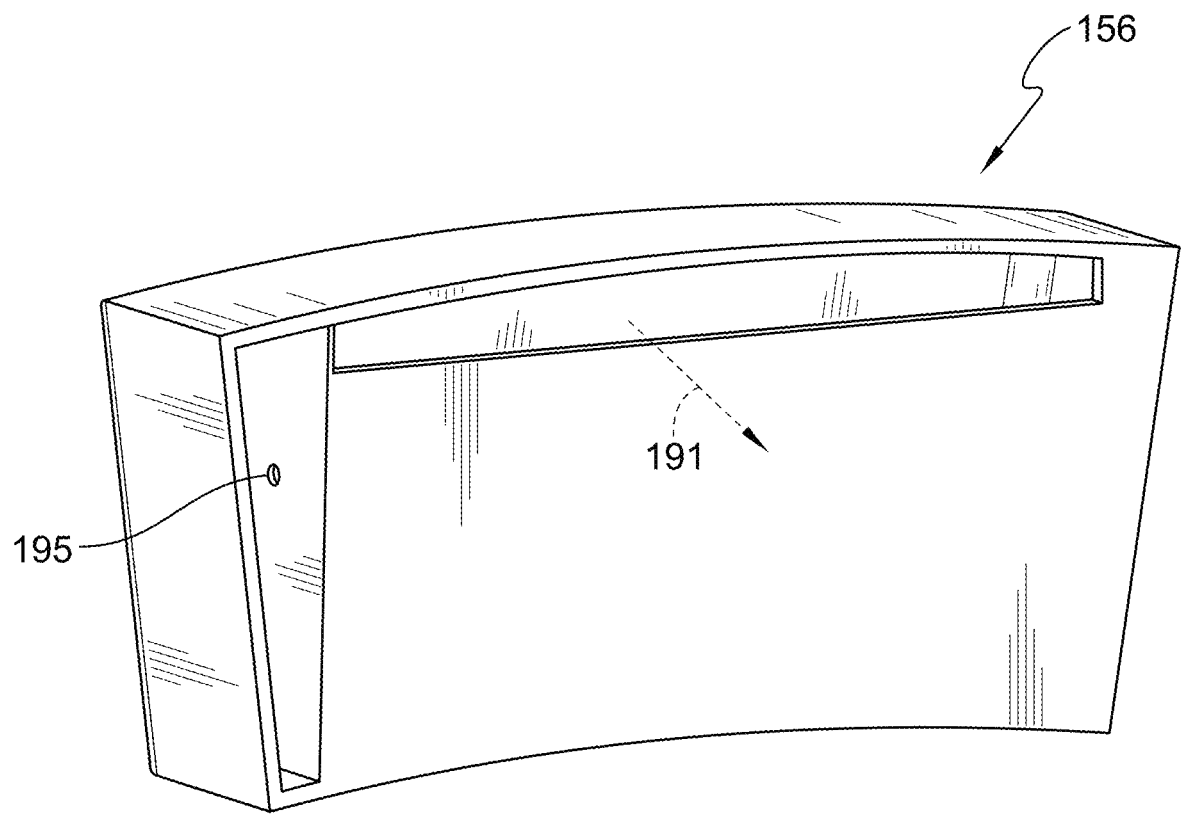
Figure 5A:
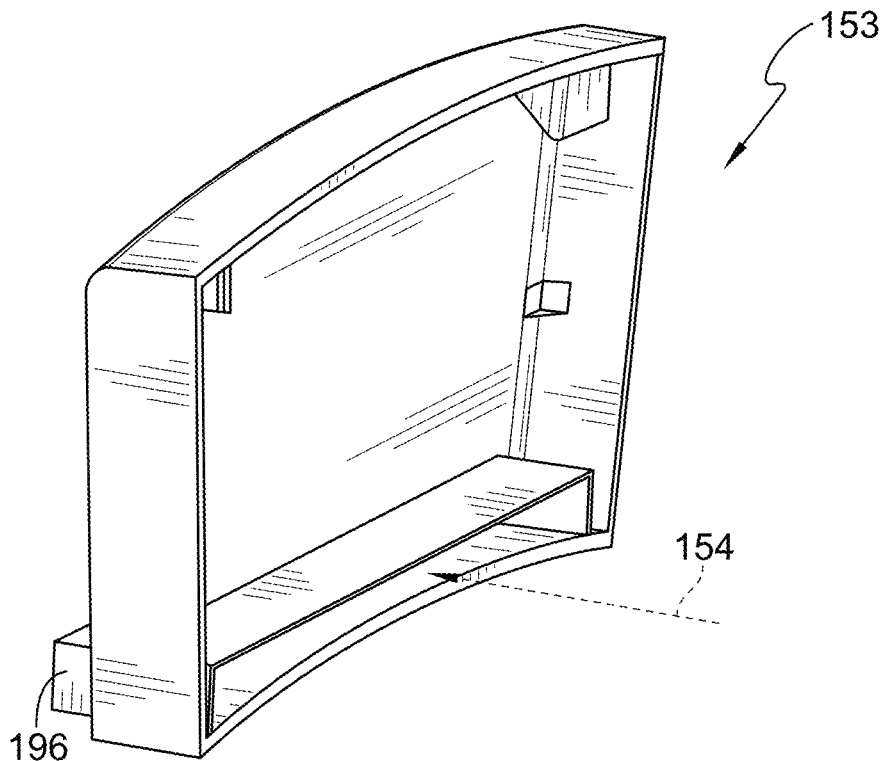
FIGS. 5A-5B are views of an embodiment of an exhaust manifold of the solid oxide fuel cell of the aircraft propulsion system in accordance with the present disclosure.
Figure 5B:
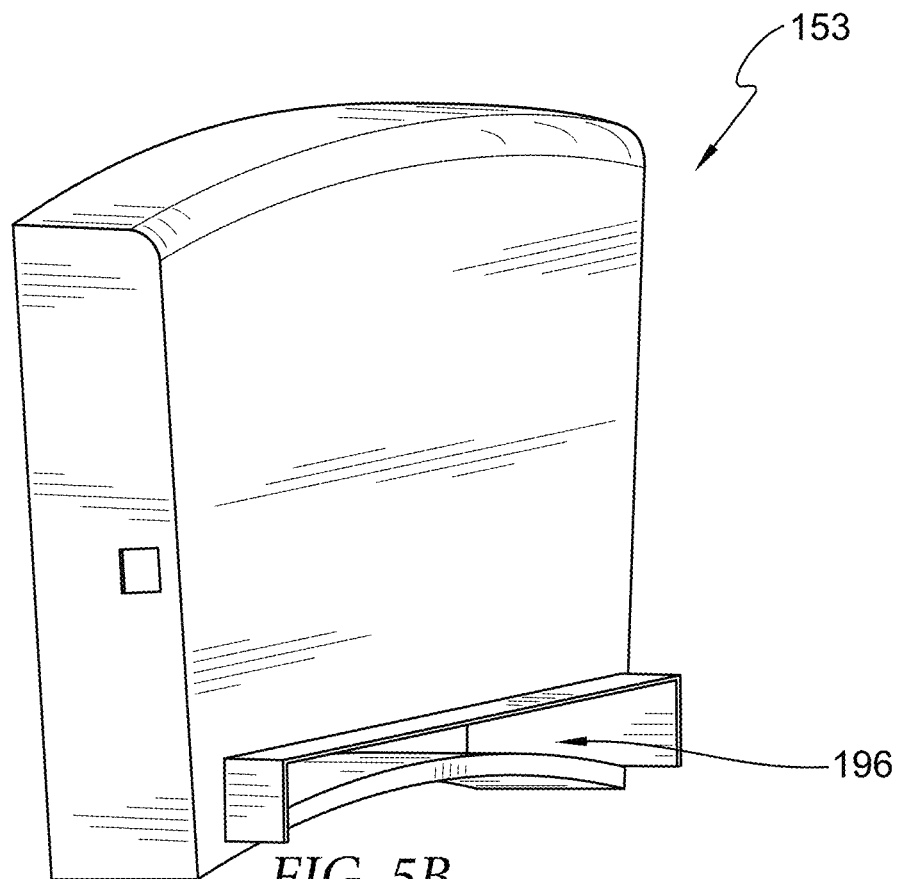

The combustion chamber 156 may also be referred to herein as a combustion manifold 156 and may be shown in greater detail in FIGS. 4A-4B. The combustion chamber 156 may either be positioned within the fuel cell unit 155 or external to the fuel cell unit 155. Fuel from the fuel source 106 may flow through or interact with the anode 157, prior to entering the combustion chamber 156 for combustion with compressed air 162 via an air inlet 194. Combustion products 191 from the combustion chamber 156 may travel past or interact with the cathode 158 prior to leaving the fuel cell unit 155 as output gases 154 via an exhaust outlet 196 of the exhaust manifold 153 (shown in greater detail in FIGS. 5A-5B). The cathode 158 may reduce or remove pollutants from the combustion products 191. At high operating temperatures typically above 800° C., oxygen ions from the cathode 158 migrate through the solid oxide conducting electrolyte (e.g., separating the cathode from the anode) to the anode 157, where they react with fuel, generating electrons (e.g., power 152).

Additional details of the fuel cell unit 155 may be shown in FIGS. 6A-6C and 7A-7B. For example, the fuel cell unit 155 may include a housing 197 and a fuel cell rod or tube rack 198 for holding and properly positioning each of the one or more solid oxide fuel cell tubes 159 relative to each other.

Figure 8:
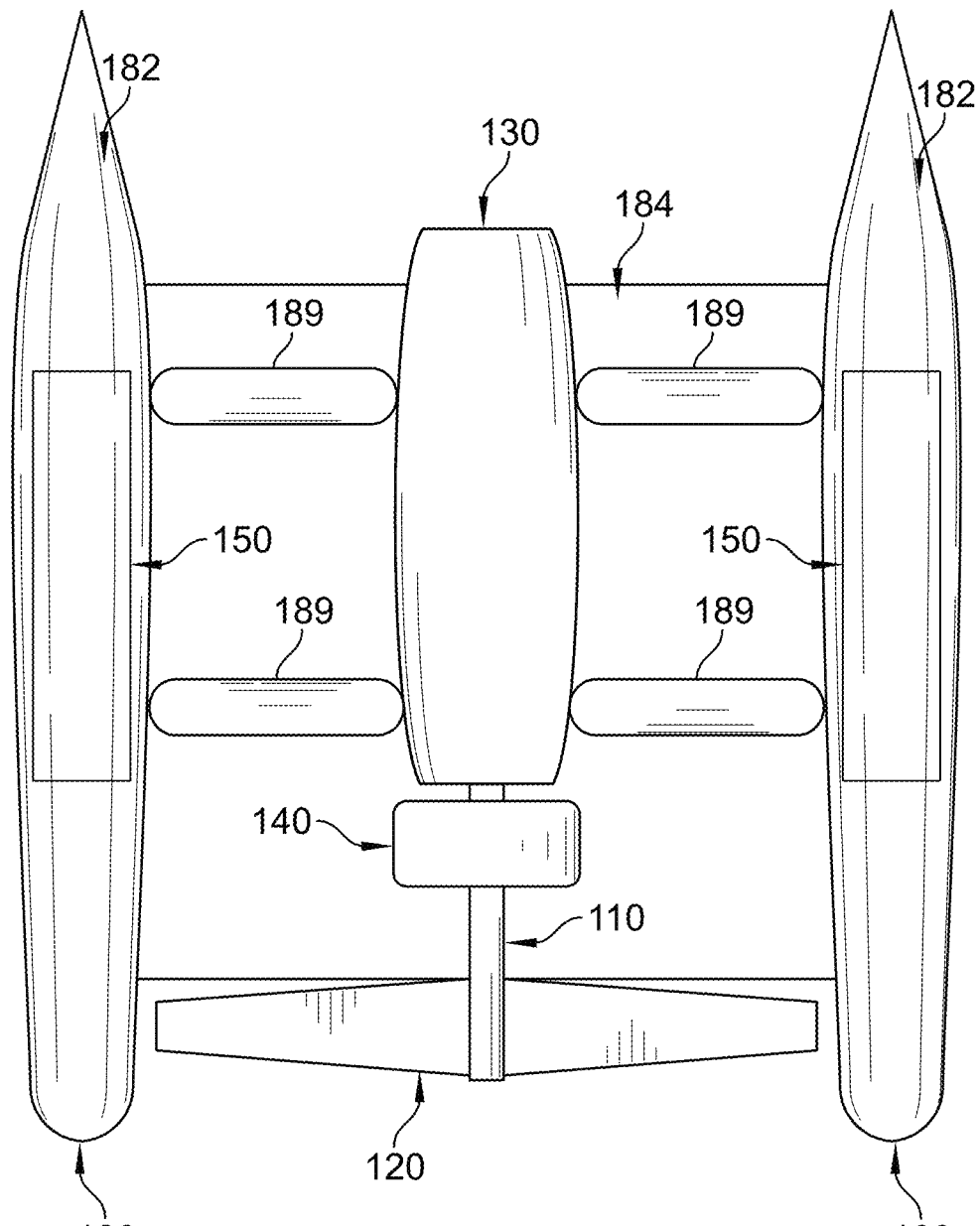
FIGS. 8-10 are views of embodiments of the aircraft propulsion system in accordance with the present disclosure.
Figure 9:
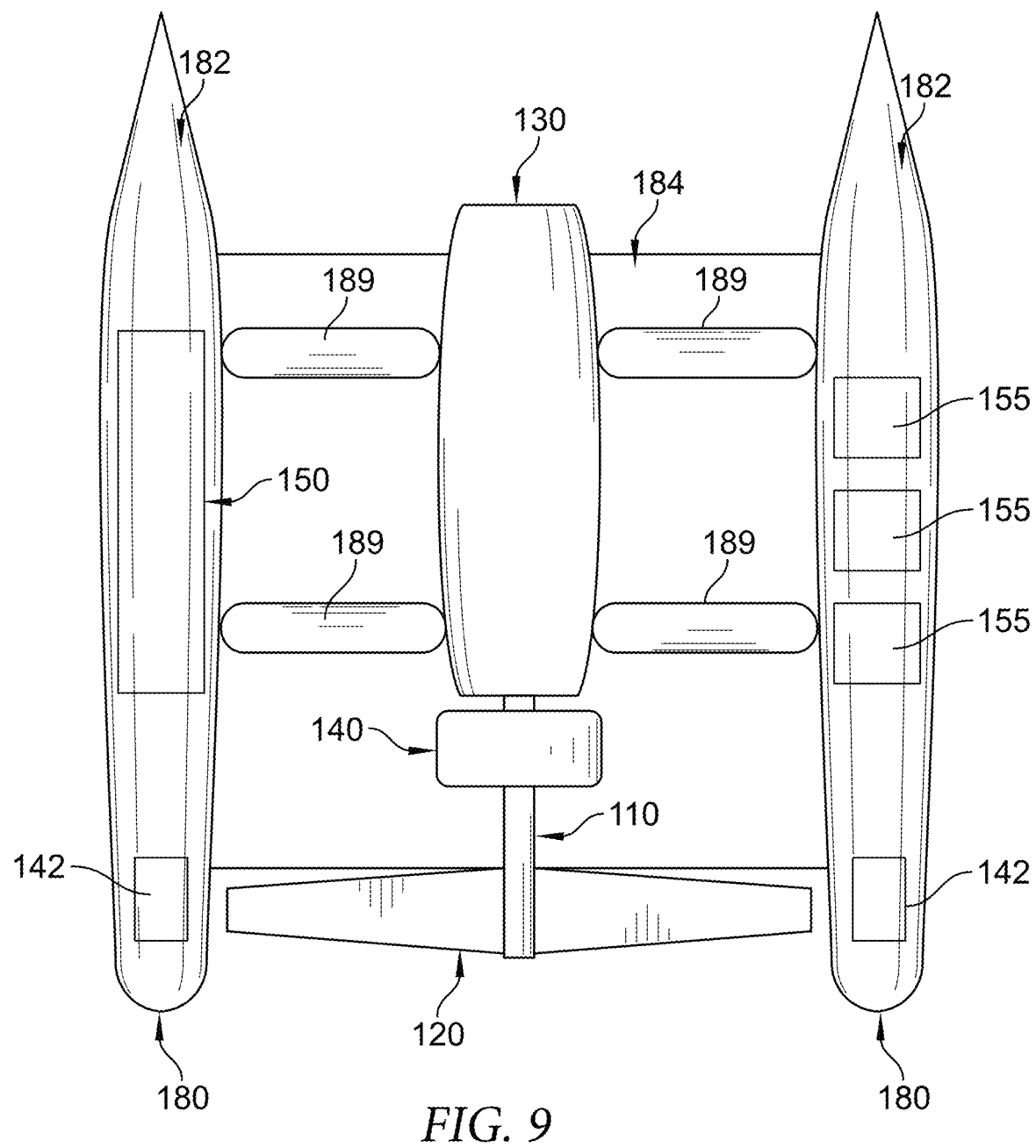
Figure 10:
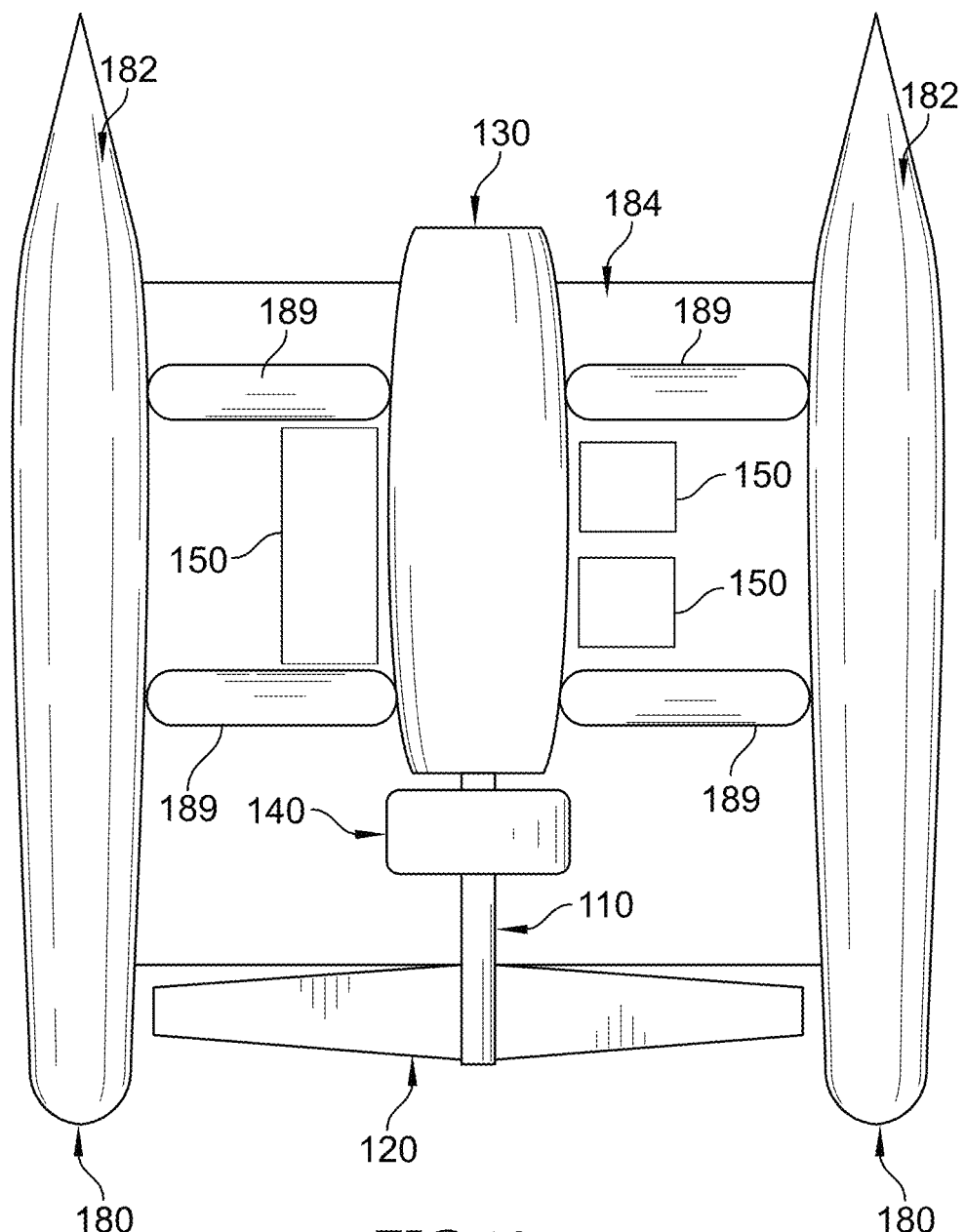

Referring to FIGS. 8-10, high level block diagrams of embodiments of the propulsion system 100 are illustrated. Additional details of said embodiments are evident based upon the above description and element numbering, however, it is noted that FIG. 9 further illustrates the fuel cell unit 155 and the electronic drive system 142. In certain optional embodiments, as illustrated in FIG. 10, the solid oxide fuel cell 150 may be radially disposed around the gas turbine 130 fully surrounded by the cylindrical passageway 184 within the nacelle 180. In other optional embodiments, the configuration of FIG. 10, specifically, the solid oxide fuel cell 150 may be radially disposed around one or more of the gas turbine 130, the electric motor 140, or the shaft 110, may be applicable for distributed propulsion with multiple propulsors integrated within a wing (e.g., with no obvious nacelle 180). By surrounding (or radially disposing) the gas turbine 130, the electric motor 140, and/or the shaft 110 with the solid oxide fuel cell 150, the propulsion system 100 may be appliable for integration into the wings or other parts of the aircraft or other vehicle, while also providing a robust and compact system.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Although embodiments of the present invention have been described in detail, it will be understood by those skilled in the art that various modifications can be made therein without departing from the spirit and scope of the invention as set forth in the appended claims.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. A propulsion system comprising:
an electric motor for propulsion; and
a fuel cell configured to receive compressed air from a compressor and fuel from a fuel source and provide power to at least the electric motor,
wherein the fuel is configured to be combusted within a combustion chamber of the fuel cell after interacting with an anode of one or more fuel cell tubes to define combustion products, and
wherein the combustion products interact with a cathode of the one or more fuel cell tubes prior to exiting the fuel cell as output gases.

2. The propulsion system of claim 1, wherein the fuel cell is a solid oxide fuel cell.

3. The propulsion system of claim 1, wherein the fuel cell is positioned within a nacelle having a hollow ring-shaped interior surrounding a cylindrical passageway, the cylindrical passageway including a fan and a turbine coupled to a common shaft positioned within the cylindrical passageway.

4. The propulsion system of claim 3, wherein the fuel cell is radially disposed within the hollow ring-shaped interior of the nacelle, separate from and fully surrounding the cylindrical passageway.

5. The propulsion system of claim 1, further comprising a downstream expansion device configured to receive the output gases and convert thermal energy therein into mechanical power.

6. The propulsion system of claim 5, wherein the expansion device is a turbine operatively coupled to a propulsor.

7. The propulsion system of claim 1, further comprising an exhaust manifold configured to direct the combustion products away from the fuel cell after passing over the cathode of the one or more fuel cell tubes.

8. The propulsion system of claim 1, wherein the fuel cell is configured to provide electrical power to one or more of the electric motor, an electric payload, or an onboard energy storage system.

9. The propulsion system of claim 1, wherein the fuel is selected from hydrogen, methane, natural gas, or a hydrocarbon-based fuel suitable for fuel cell operation.

10. The propulsion system of claim 1, further comprising a nacelle with nacelle support struts configured to structurally support at least one of: a shaft, a fan, a turbine, the electric motor, the compressor, or the fuel cell.

11. The propulsion system of claim 10, wherein the nacelle support struts include one or more internal passageways configured to route compressed air to the fuel cell and/or route output gases from the fuel cell to the turbine.

12. A hybrid propulsion system comprising:
a shaft;
a turbine coupled to the shaft;
an electric motor coupled to the shaft; and
a fuel cell configured to receive compressed air from a compressor and fuel from a fuel source, to provide electrical power to the electric motor, and to provide output gases to the turbine;
wherein the turbine and the electric motor are configured to supply torque to the shaft in parallel,
wherein the fuel cell is positioned within a nacelle having a hollow annular interior separated from and surrounding a cylindrical passageway.

13. The hybrid propulsion system of claim 12, further comprising a fan coupled to the shaft and configured to receive torque from at least one of the turbine or the electric motor.

14. The hybrid propulsion system of claim 12, wherein the compressor is coupled to the shaft and configured to supply compressed air to the fuel cell.

15. The hybrid propulsion system of claim 12, wherein the fuel cell comprises a combustion chamber positioned between an anode and a cathode of one or more fuel cell tubes, and an exhaust manifold configured to direct combustion products away from the fuel cell.

16. The hybrid propulsion system of claim 12, wherein the fuel cell is radially disposed within the hollow annular interior and fully surrounds the cylindrical passageway.

17. The hybrid propulsion system of claim 12, wherein the turbine is configured to receive combustion gases from the fuel cell as a primary source of heat energy for mechanical expansion.

18. The hybrid propulsion system of claim 12, further comprising a combustor configured to receive at least one of fuel or output gases from the fuel cell and to supply additional combustion products to the turbine.

19. The hybrid propulsion system of claim 12, wherein the fuel cell is configured to supply electrical power to at least one of the electric motor, an electric payload, or an onboard energy storage system.

* * * * *